United States Patent [19]
Carmillet et al.

[11] Patent Number: 4,674,992
[45] Date of Patent: Jun. 23, 1987

[54] TORSIONAL DAMPER DEVICE

[75] Inventors: Roger Carmillet, Birmingham; Michel Graton, Paris; Michel Bacher, Domont, both of France

[73] Assignee: Valeo, Paris, France

[21] Appl. No.: 761,517

[22] Filed: Aug. 1, 1985

[30] Foreign Application Priority Data

Aug. 3, 1984 [FR] France ............................ 84 12293

[51] Int. Cl.⁴ .............................................. F16D 3/12
[52] U.S. Cl. ..................................... 464/68; 192/106.2
[58] Field of Search .......................... 74/574; 188/381; 192/106.1, 106.2, 70.17; 464/68

[56] References Cited

U.S. PATENT DOCUMENTS

| 3,327,820 | 6/1967 | Maurice | 192/106.2 X |
| 4,212,380 | 7/1980 | Billet | 192/106.2 |
| 4,301,907 | 11/1981 | Carpenter et al. | 192/106.2 |
| 4,410,075 | 10/1983 | Caray et al. | 192/106.2 |
| 4,485,908 | 12/1984 | Gatewood | 192/106.2 |
| 4,545,473 | 10/1985 | Alas | 192/106.2 |

FOREIGN PATENT DOCUMENTS

| 2386729 | 11/1978 | France . |
| 2503295 | 10/1982 | France . |
| 2539194 | 7/1984 | France . |
| 2540583 | 8/1984 | France . |

Primary Examiner—Duane A. Reger
Attorney, Agent, or Firm—Charles E. Brown; Charles A. Brown

[57] ABSTRACT

A torsional damper device comprises at least two coaxial parts disposed to rotate relative to one another within defined limits of relative angular displacement. Circumferentially acting elastic means operative between these parts over at least part of this relative angular displacement resist same. A first coaxial part comprises a hub and an annular hub flange around the hub, constrained to rotate with the hub for one circumferential direction. A second coaxial part comprises at least one annular guide ring around the hub free to rotate relative to it in both circumferential directions. The device further comprises an annular hub counter-flange around the hub constrained to rotate with the hub for one circumferential direction. The hub flange and the hub counter-flange are each free to rotate relative to the hub in the circumferential direction opposite that in which it is constrained to rotate with it. The result is that for one circumferential direction the hub flange is free to rotate relative to the hub and the hub counter-flange is constrained to rotate with it, whereas for the opposite circumferential direction the hub flange is constrained to rotate with the hub and the hub counter-flange is free to rotate relative to it.

5 Claims, 10 Drawing Figures

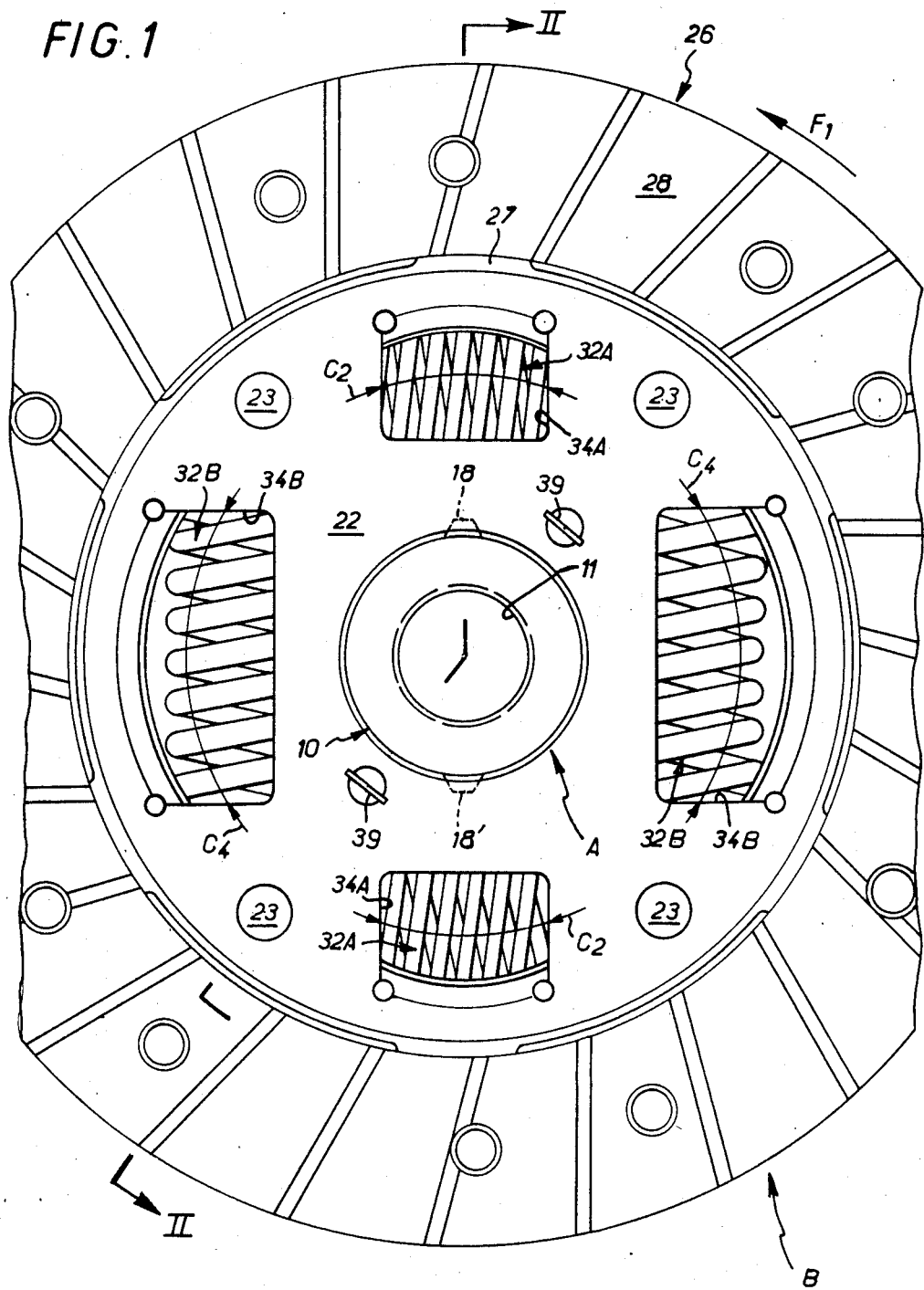

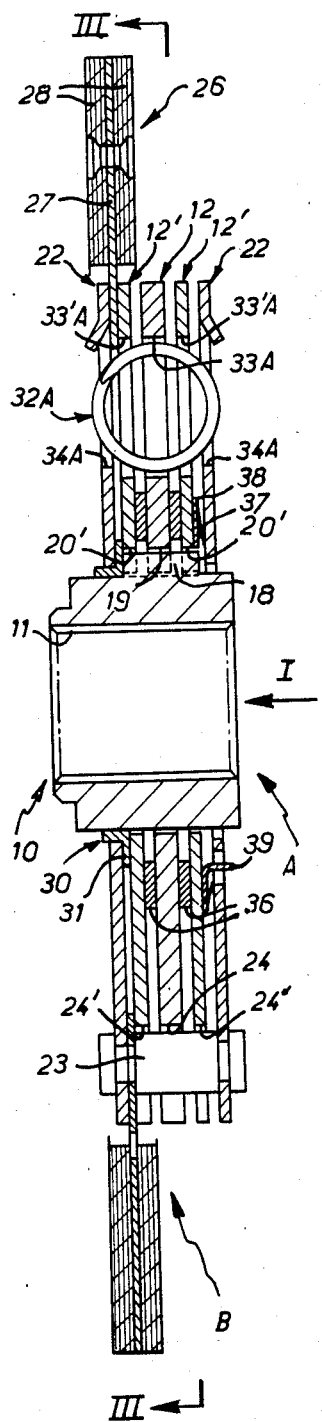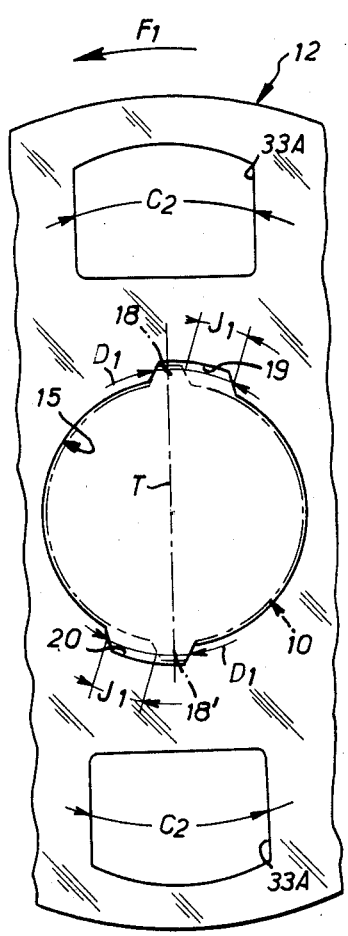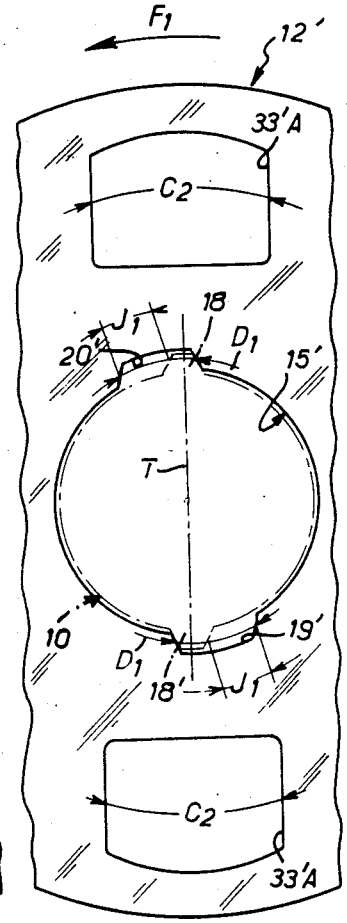

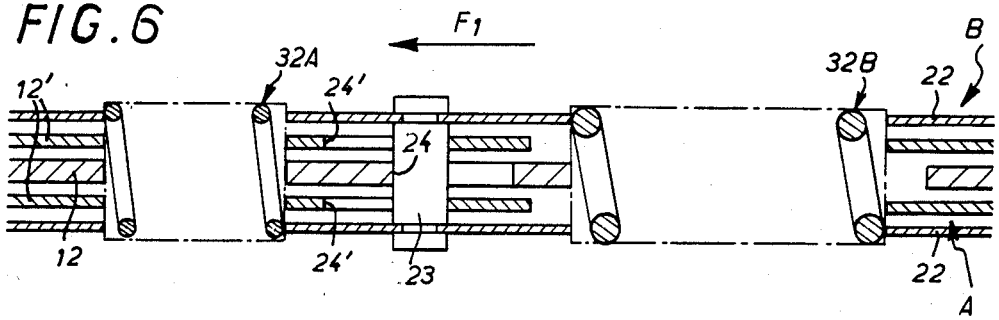
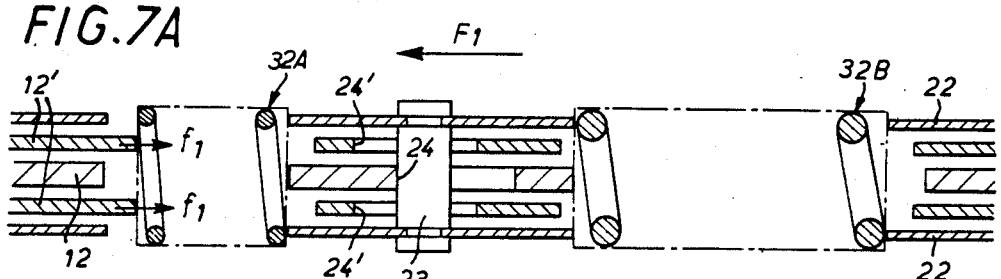
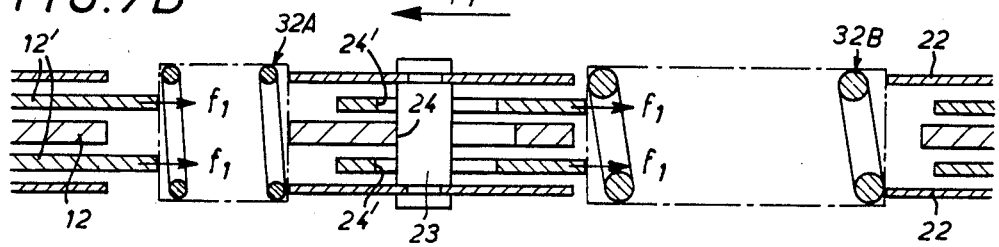
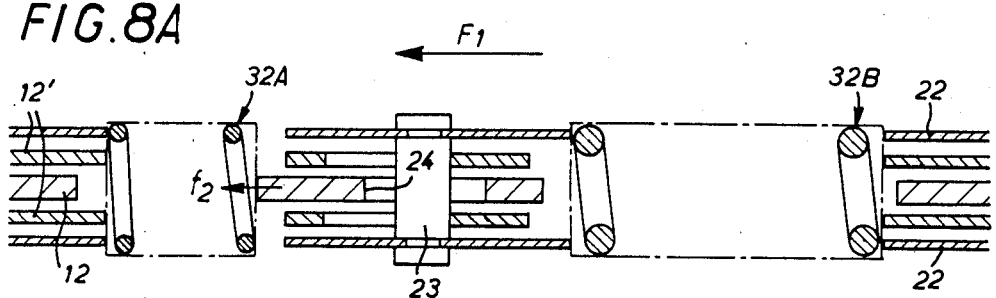
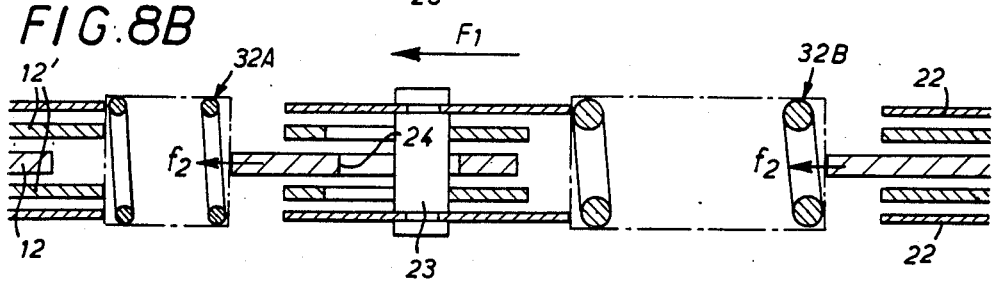

TORSIONAL DAMPER DEVICE

BACKGROUND OF THE INVENTION

1. Field of the invention

The present invention is generally concerned with torsional damper devices comprising at least two coaxial parts disposed to rotate relative to one another within defined limits of relative angular displacement against elastic means. The elastic means, usually called circumferentially acting elastic means, is adapted to be operative circumferentially between the two coaxial parts for part at least of such relative angular displacement. Namely, a first part which comprises a hub and a flange, usually called the hub flange, which forms an annular part around the hub and which, for at least one circumferential direction, is constrained to rotate with the hub. A second part which comprises at least one flange, usually called a guide ring and forms an annular part around the hub, but which is free to rotate relative to the hub in both circumferential directions.

2. Description of the prior art

As is known, this type of torsional damper is normally incorporated in the design of a clutch disk, particularly for automobile vehicles. Its rotary parts which comprise at least one guide ring carrying a friction disk designed to be constrained to rotate with a first shaft, a driving shaft or the motor output shaft in the case of an automobile vehicle. The other of these rotary parts is adapted to be constrained to rotate through its hub with a second shaft, a driven shaft or the gearbox input shaft in the case of an automobile vehicle.

In this way it is possible with advantage to procure regulated transmission of rotational torque from one of these shafts to the other. It provides filtering of vibrations which may arise at any point in the kinematic system in which the shafts are incorporated, extending from the motor to the wheel shafts in the case of an automobile vehicle.

In practice two guide rings are provided, parallel to and axially spaced from one another. One guide ring on each side of the hub flange and linked to one another by axial spacers which pass through said hub flange by means of openings provided in it for this purpose.

One problem to be solved in implementing torsional damper devices of this kind results from the need to reconcile two apparently contradictory requirements.

The first of these requirements relates to the fact that to minimize or even reduce certain sources of noise. More precisely the noise commonly called "trash" noise whish arises when the driver of the vehicle concerned depresses or releases the accelerator pedal and the gears in the gearbox of the vehicle impact on one another under load. It appears desirable, as is confirmed by experience, that the circumferentially acting elastic means, disposed between the two coaxial parts of a torsional damper device of this kind which are the first to come into action, features a relatively low stiffness. In practice it is not of more than 1 m.daN per degree.

As a corollary to this, a second requirement which normally has to be met, and which is in this instance imperative, is that at the end of angular displacement between said rotary parts, the maximum permissible torque is greater than the most usual maximum motor torque values. These are frequently of the order of 15 to 17 m.daN.

For safety reasons, it is therefore desirable that the maximum torque that can be transmitted between the two coaxial parts of a torsional damper device of the kind in question should be of the order of 20 m.daN, for example. In torsional damper devices of the kind in question known at present, the maximum angular displacement possible between said coaxial parts is limited. This angular displacement is limited by the circumferential extent that can be given to the openings formed in the hub flange for the axial spacers coupling together the two guide rings to pass through.

Beyond a certain circumferential dimension, these openings inevitably reduce to an unacceptable, degree the mechanical strength of the hub flange, reducing the service life of the device.

In practice, in torsional damper devices of the kind in question known at present, the angular displacement between the two coaxial parts is more often 10 degrees or less. Thus if, in order to minimize "trash" noise, there are employed between these two parts circumferentially acting elastic means which have only moderate stiffness, of the order of 1 m.daN per degree. The maximum permissible torque at the end of their angular displacement is at most of the order of 10 m.daN, which is insufficient.

A general object of the present invention is an arrangement whereby this difficulty may be overcome and hence the contradictory requirements reconciled.

SUMMARY OF THE INVENTION

The present invention relates to a torsional damper device which comprises at least two coaxial parts disposed to rotate relative to one another within defined limits of relative angular displacement and circumferentially acting elastic means operative between the coaxial parts over at least part of the relative angular displacement to resist the same. A first of the coaxial parts comprises a hub and an annular hub flange around the hub constrained to rotate with the hub in one circumferential direction. A second of the coaxial parts comprises at least one annular guide ring around the hub free to rotate relative thereto in both circumferential directions. The device further comprises an annular hub counter-flange around the hub associated with the hub flange and constrained to rotate with the hub in one circumferential direction. The hub flange and the hub counter-flange are each free to rotate relative to the hub in the circumferential direction opposite that in which it is constrained to rotate therewith. The result is that for one circumferential direction the hub flange is free to rotate relative to the hub and the hub counter-flange is constrained to rotate therewith. Whereas, for the opposite circumferential direction the hub flange is constrained to rotate with the hub and the hub counter-flange is free to rotate relative thereto.

In other words, in accordance with the invention there is procured release of the hub flange relative to the hub in one circumferential direction and, conjointly, duplication of the hub flange by the hub counter-flange with differential intervention of the hub flange or the hub counter-flange according to the circumferential direction concerned.

The originality of an arrangement of this kind will be seen more clearly when it is emphasized that, at present, in torsional damper devices of the kind concerned, there is usually only one hub flange constrained to rotate with the hub for both circumferential directions.

Be this as it may, the hub flange alone is operative in a first circumferential direction, whereas only the hub counter-flange is operative in the opposite circumferential direction. It is advantageously possible in accordance with the invention to divide the overall relative angular displacement between the two coaxial parts constituting the torsional damper device concerned. It is also possible, other things being equal with regard to mechanical considerations, to obtain a maximum relative angular displacement of the coaxial parts significantly greater than that normally permissible in torsional damper devices of this kind known at present.

In practice, by virtue of the arrangement in accordance with the invention, this relative angular displacement may without difficulty be of the order of 20°, for example.

An advantageous result of this is that it is possible to employ between the two coaxial parts constituting the torsional damper device circumferentially acting elastic means which feature an initial relative angular displacement between said coaxial parts and has only moderate stiffness, of the order of 1 m.daN per degree, for example.

The characteristics and advantages of the invention will emerge from the following description given by way of example with reference to the appended schematic drawings.

BRIEF DESCRIPTION OF THE DRAWINGS

FIG. 1 is a partial view in elevation of a torsional damper device in accordance with the invention, in the direction of the arrow I in FIG. 2.

FIG. 2 is a view of it in axial crosssection on the broken line II—II in FIG. 1.

FIGS. 4 and 5 are partial views in elevation, the former of the hub flange and the latter of a hub counter-flange employed in the torsional damper device in accordance with the invention, the hub flange and the hub counter-flange being shown in isolation.

FIG. 6 is a view of the torsional damper device in accordance with the invention in circumferential cross-section on the line IV—IV in FIG. 2, developed in the flat.

FIGS. 7A, 7B and 8A, 8B are views analogous to that of FIG. 6 showing various phases in the operation of the torsional damper device in accordance with the invention.

DESCRIPTION OF THE PREFERRED EMBODIMENT

Figure 3:
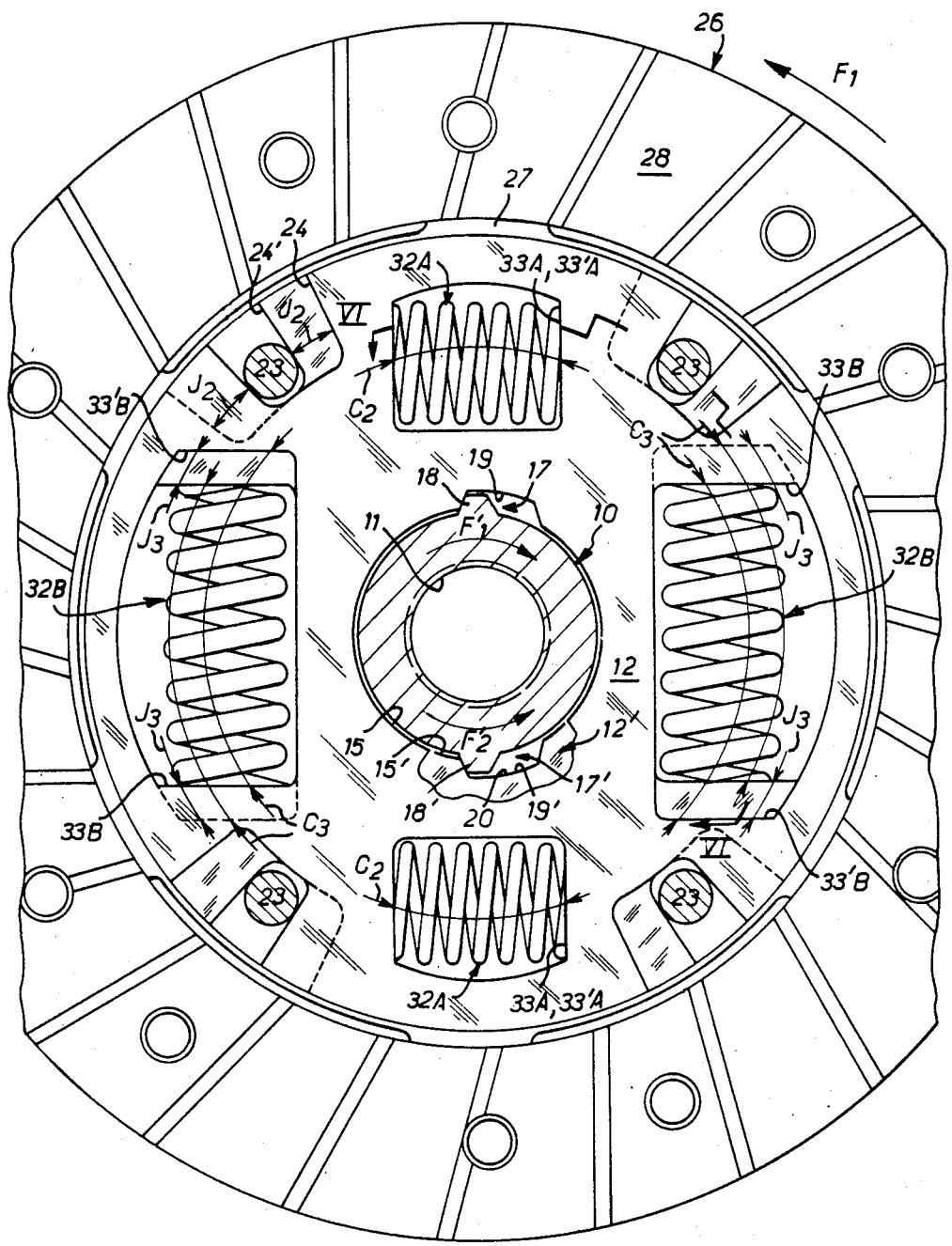
FIG. 3 is a view of it in transverse cross-section on the line III—III in FIG. 2.

The figures illustrate the invention of the present application directed to a clutch disk, in particular for automobile vehicles. Overall, the torsional damper device which constitutes this clutch disk comprises, in the embodiment shown, two coaxial parts A, B disposed to rotate relative to one another within defined limits of relative angular displacement against elastic means, hereinafter called circumferentially acting elastic means, adapted to be operative circumferentially between them for part at least of such relative angular displacement.

The first part A comprises a hub 10 designed to be constrained to rotate with a shaft (not shown). In practice the gearbox input shaft of the vehicle concerned which is a driven shaft. For example, and as shown here, the internal bore 11 of the hub 10 is splined to this end. The part A further comprises a flange 12, usually called the hub flange, which forms an annular transverse part around the hub 10 and which is constrained to rotate with said hub 10 in one circumferential direction, by virtue of arrangements to be described in more detail subsequently.

In accordance with the invention, associated with the flange constituting the hub flange 12 is at least one other flange 12', hereinafter referred to for convenience as the hub counter-flange. The hub counter-flange 12 forms a transverse annular part around the hub 10 and is constrained to rotate with the hub for one circumferential direction. By virtue of an alternate arrangement also to be described in detail later, the hub flange 12 and the hub counter-flange 12' are both free to rotate relative to the hub 10 in the circumferential direction opposite to that for which each is constrained to rotate with it. In practice, in the embodiment shown, there are two identical hub counter-flanges 12' disposed one on each side of the hub flange 12.

The hub flange 12 features an axial opening 15 by means of which it is engaged on the hub 10 and, likewise, the hub counter-flanges 12' each have an axial opening 15' by which they are also engaged on the hub 10. Meshing means 17 implemented with clearance are provided between the hub 10 and the hub flange 12.

Operative in the embodiment shown by virtue of the opening 15 in the hub flange 12, these meshing means 17 comprise, in this embodiment, at least one tooth 18 projecting radially for this purpose from the outside periphery of the hub 10 and at least one notch 19 provided for this purpose on the edge of the opening 15 in the hub flange 12 and by means of which the latter is engaged with clearance over the tooth 18 on the hub 10.

As a corollary to this, and in a similar manner, meshing means 17' implemented with clearance are provided between the hub 10 and each of the hub counter-flanges 12'. These meshing means 17' with clearance comprise at least one tooth 18' projecting radially to this end from the outside periphery of the hub 10 and at least one notch 19' provided on the edge of the opening 15' in each of the hub counter-flange 12' and by means of which the hub counter-flange 12' is engaged with clearance over the tooth 18' on the hub 10.

Furthermore, in this embodiment the radial teeth 18, 18' on the outside periphery of the hub 10 are situated in diametrically opposed positions relative to one another. For the purpose of its engagement with clearance over the tooth 18' on the hub 10, the hub flange 12 features on the edge of its opening 15 a notch 20; for the purposes of their engagement with clearance over the tooth 18 on the hub 10. Each of the hub counter-flanges 12' similarly features a notch 20' in the edge of the opening 15'. In the case of the hub flange 12, the notches 19 and 20 have the same circumferential extent D1 and they are generally in diametrically opposite positions relative to one another. Similarly, in the case of each of the hub counter-flanges 12', the notches 19', 20' have the same circumferential extent D1, equal to that previously referred to, and are also generally speaking in diametrically opposite positions relative to one another.

The result of what has been described is that, in the embodiment shown, the meshing means 17 with clearance between the hub 10 and the hub flange 12 comprise not only the tooth 18 on the hub 10 but also the tooth 18', respectively cooperating with the notches 19 and 20 on said hub flange 12. In addition the meshing means 17' with clearance between the hub 10 and each of the hub counter-flanges 12' comprises not only the tooth 18' on the hub 10 but also the tooth 18, respectively cooperating with the notches 19' and 20' on the hub counter flange 12'.

In the idle configuration of the device, as shown in FIGS. 1 through 6, the meshing means 17 with clearance between the hub 10 and the hub flange 12 are in circumferential abutting relationship for one circumferential direction and the meshing means 17' with clearance between the hub 10 and each of the hub counter flanges 12' are likewise in circumferential abutting relationship for the opposite circumferential direction.

For example, and as shown here, for the circumferential direction shown by an arrow F1 in FIGS. 1 and 3 through 8, corresponding for example to forward motion of the vehicle concerned and to "upshift" operation of the device, in which case the rotational torque of the driving shaft is greater than the rotational torque of the driven shaft, since the motor is driving the vehicle. It is the meshing means 17' with clearance between the hub 10 and each of the hub counter-flanges 12' which are in circumferential abutting relationship for the idle configuration of the device. The notches 19' and 20' of a hub counter-flange 12' then bear circumferentially against the teeth 18 and 18' respectively of the hub flange 10 through that of their circumferential end edges which is on the upstream side in the circumferential direction concerned.

J1 is the circumferential clearance existing between a tooth 18, 18' of the hub 10 and the other of the circumferential end edges of the notches 19', 20' of each of the hub counter-flanges 12' (FIG. 5).

Conjointly, in this case, it is for the opposite circumferential direction that the meshing means 17 with clearance between the hub 10 and the hub flange 12 are in circumferential abutting relationship.

As shown, for the idle configuration of the device, the hub flange 12 bears circumferentially on the teeth 18, 18' on the hub 10 through that of the circumferential end edges of its notches 19, 20 which is upstream in the circumferential direction opposite to that shown by the arrow F1 in FIGS. 1 and 3 through 8.

There then exists a circumferential clearance J, of the same value as previously, between these teeth 18, 18' on the hub 10 and that of the circumferential end edges of the notches 19, 20 on the hub flange which is on the downstream side in this circumferential direction.

This circumferential direction, which is that opposite the circumferential direction shown by the arrow F1 in FIGS. 1 and 3 through 8, corresponds to "downshift" operation of the device effective, as is known, when the driving shaft rotational torque becomes lower than that of the driven shaft, in which case the vehicle decelerates the motor.

The result of what has been explained above is that, for the circumferential direction shown by the arrow F1 in FIGS. 1 and 3 through 8, each of the hub counter-flanges 12' is constrained to rotate with the hub 10 whereas the hub flange 12 is free to rotate relative to the latter. In the opposite circumferential direction, it is the hub flange 12 which is constrained to rotate with the hub 10 whereas each of the hub counter-flanges 12' is then free to rotate relative to the latter.

It is in this sense that, relative to the hub 10 and as indicated hereinabove, there is established an alternate relationship between the hub flange 12 and each of the hub counter-flanges 12'.

It also results from what has been explained above that the hub flange 12 and the hub counter-flanges 12' have the same configuration, inclusive of the openings 15, 15' and the notches 19-20, 19'-20', each of the hub counter-flanges 12' being derived from the hub flange 12 by rotation through 180° about a diameter T of the device passing through the teeth 18, 18' on the hub 10.

For greater clarity this diameter T is schematically represented in chain-dotted line in FIGS. 4 and 5.

It is to be understood that each of the hub counter-flanges 12' is thinner than the hub flange 12.

However, the same tool may advantageously be employed to fabricate these hub counter-flanges 12' and the hub flange 12. In the embodiment shown the teeth 18, 18' extend axially over part only of the length of the hub 10, in the median area thereof. The second part B comprises, in the manner known per se, at least one flange 22, usually called a guide ring, which also forms an annular part around the hub 10 but which is free to rotate relative to the latter in both circumferential directions.

In practice, and also as known per se, there are two such guide rings 22 disposed one on each side of the hub flange 12 and the hub counter-flanges 12' and constrained to rotate with one another by axial spacers 23 passing with clearance through notches 24, 24' provided to this end at the outside periphery of the hub flange 12 and the hub counter-flanges 12'. In the embodiment shown, four axial spacers 23 are thus provided, in a substantially x-shaped arrangement relative to the axis of the assembly. In accordance with the invention each of the notches 24, 24' may advantageously be in contact through one of its circumferential end edges with the axial spacer 23 which passes through it.

In the case of the hub flange 12, the circumferential end edge of a notch 24 which is in contact with the corresponding axial spacer 23 in the idle configuration of the device, is that which is on the downstream side for the circumferential direction shown by the arrow F1 in FIGS. 1 and 3 through 8. By virtue of an alternate arrangement of the same type as previously described, a notch 24' is provided in each of the hub counter-flanges 12'. The circumferential end edge of which is in contact with the corresponding axial spacer 23 for the idle configuration of the device and which is on the upstream side in the circumferential direction shown by said arrow F1 in FIGS. 1 and 3 through 8. In this way the notches 24, 24' may have the maximum circumferential extent for a given mechanical strength of the hub flange 12 and the hub counter-flanges 12'.

As will emerge hereinafter, each flange or counter-flange is cut out only to the extent necessary for relative angular displacement between the parts A and B. This corresponds to "upshift" or "downshift" operation only of the device, instead of to the extent necessary for both "upshift" and "downshift" operation.

J2 is the circumferential clearance existing in the idle configuration of the device between each axial spacer 23 and that of the circumferential end edges of the notches 24, 24' through which it passes that is spaced from it.

The part B further comprises a friction disk 26.

The flange 27 of the friction disk may be circumferentially divided into sectors and is in back-to-back relationship with one of the guide rings 22, on the inside surface of the latter. It is fastened to this guide ring 22 by the axial spacers 23 already constraining the latter to rotate with the other guide ring 22 with which it is associated. At its periphery the flange 27 of this friction disk 26 has two axially projecting friction facings 28, one on each side.

By clamping these friction facings 28 between two plates, namely a pressure plate and a reaction plate (not shown), the part B can be constrained to rotate with a shaft. In practice this is a driving shaft. In this instance of a clutch disk for automobile vehicles, it is more specifically the motor output shaft of the vehicle.

For centering the part B relative to the part A there is radially disposed between one of the guide rings 22 of the part B and the hub 10 of part A a bearing 30. In practice, and as shown here, this bearing 30 is thus associated with that of the guide rings 22 with which the flange 27 of the friction disk is in back-to-back relationship.

In practice, it is in one piece with a collar 31 which, projecting radially away from the axis of the device, is axially disposed between the guide ring 22 concerned and the hub counter-flange 12' near the latter.

The guide rings 22 are in practice disposed axially beyond the teeth 18, 18' on the hub 10.

The circumferentially acting elastic means disposed circumferentially between the parts A and B thus constituted comprise a plurality of elastic members 21 circumferentially distributed around the axis of the device and all disposed substantially tangentially relative to a common circumference of the latter.

In the embodiment shown there are thus two elastic members 32A of relatively low stiffness and, alternating with these, in a cruciform arrangement, two elastic members 32B of greater stiffness. In practice these are coil springs.

These elastic members 32A, 32B are individually accommodated partly in openings 33A, 33B–33'A, 33'B in the hub flange 12 and the hub counter-flanges 12' and partly in openings 34A, 34B in the guide rings 22. In practice, these openings are formed by holes provided for this purpose in the flanges concerned.

In the case of the openings 34A, 34B thus provided in the guide rings 22, that of the radial end edges of an opening which is radially furthest from the axis of the device is bordered by a louver-shaped lip for retaining the corresponding elastic member 32A, 32B.

For one at least of these, and in practice this means for both of the elastic members 32A or relatively low stiffness in the embodiment shown, the openings 33A, 33'A in the hub flange 12 and the hub counter-flanges 12' have the same circumferential extent C2 as the corresponding openings 34A, 34B in the guide rings 22.

For at least one other of the elastic members 32A, 32B and in practice this means for both of the elastic members 32B of relatively higher stiffness in the embodiment shown, the openings 33B, 33'B in the hub flange 12 and the hub counter-flanges 12' have a circumferential extent 3C greater than that C4 of the corresponding openings 34B in the guide rings 22. In the idle configuration of the device and for at least one circumferential direction, it is with a circumferential clearance J3 that the elastic members 32B are individually engaged in the openings 33B, 33'B in the hub flange 12 and the hub counter-flanges 12'.

By nature of an alternate arrangement analogous to that previously described, this circumferential clearance 3, which is in practice the same for the hub flange and for the hub counter-flanges 12', extends in the case of said hub flange 12 from the downstream end of the elastic members 32B concerned in the circumferential direction opposite that shown by the arrow F1 in FIGS. 1 and 3 through 8. In the case of the hub counter-flanges 12', it extends from the downstream end of the elastic members 32B for the circumferential direction shown by said arrow F1 in FIGS. 1 and 3 through 8, and thus from the end opposite the aforementioned end.

Thus the openings 33B, 33'B have the same circumferential length. Operative between the parts A, B thus constituting the torsional damper device in accordance with the invention, in the manner known per se, are friction means.

In the embodiment shown these comprise, in addition to the bearing 30, this being constrained to rotate with the guide ring 22 with which it is associated, two friction rings 36 disposed one on each side of the hub flange 12, between the latter and the associated hub counter-flanges 12'.

A spring washer 37 of the Belleville spring type, for example, disposed between the guide ring 22 opposite that with which is associated the friction disk 26 and the hub counter-flange 12' near this guide ring 22 clamps up the device in the axial direction.

In practice an application ring 38 constrained to rotate with this guide ring 22 by lugs 39 is disposed between the spring washer 37 and the hub counter-flange 12' concerned.

When, in operation, for forward motion of the vehicle concerned a rotational torque is applied to the part B and thus to the guide rings 22 forming part thereof. It is normally the guide rings 22 which, driven in the direction of rotation of the assembly as shown by the arrow F1 in FIGS. 1 and 3 through 8, tend to entrain, through the intermediary of the circumferentially acting elastic members 32A, 32B involved, the part A and this hub 10 forming part of the latter.

To simplify the following explanation it will be assumed here that, conversely to this process, and in the case of "upshift" operation, that is to say operation during which the driving shaft rotational torque is higher than that of the driven shaft, it is the hub 10, which in the circumferential direction opposite the aforementioned direction. This is shown by the arrow F'1 in FIG. 3, the hub 10 tends to entrain the guide rings 22 through the intermediary of the circumferentially acting elastic members 32A, 32B. Thus in FIGS. 6 through 8 it is assumed that these guide rings 22 are immobile.

Thus in the case of "upshift" operation, as indicated above, the hub 10 immediately entrains, by virtue of its teeth 18 and 18', the hub counter-flanges 12', as schematically represented by the arrows F1 in FIGS. 7A, 7B.

Initially, (FIG. 7A) only the elastic members 32A yield elastically, the springs constituting these have features of relatively low stiffness, which is very much lower in all cases than that of the elastic members 32B.

In a second stage (FIG. 7B), the elastic members 32B in turn yield elastically, their effects being added to those of the elastic members 32A, which remain compressed.

Throughout the corresponding process, which corresponds to "upshift" operation of the device, the hub flange 12 is inoperative, given the corresponding circumferential clearance J1, and only the hub counter-flanges 12' is operative, as described above.

The process described continues until positive bearing engagement occurs for the circumferential direction in question between the part B and the part A. Either because turns of the elastic members 32A, 32B operative between the coaxial parts have become contiguous or because at least one of the axial spacers 23 has come into contact with the corresponding circumferential end edge of the notch 24' in the hub counter-flanges 12' that it passes through.

If at any time on a change from "upshift" to "downshift" functioning the torque between the parts B and A is reversed, the motor torque becoming lower than the resisting torque, a process which is the converse of that described previously takes place, with initially expansion of the elastic members 32B and then expansion of the elastic members 32A.

In practice this expansion is virtually instantaneous. It corresponds to retrograde rotation of the hub 10 relative to the guide rings 22, as shown by the arrow F'2 in FIG. 3. In other words, during such "downshift" operation and when the device continues to turn in the circumferential direction shown by the arrow F1 in FIGS. 1 and 3 through 8, necessarily so since the vehicle concerned is still in forward motion, the hub 10 turns relative to the guide rings 22 in the opposite circumferential direction. Then, after returning to its initial position, it is the hub flange 12 which it entrains in rotation through its teeth 18, 18' as shown by the arrows F2 in FIGS. 8A, 8B.

As previously noted, initially (FIG. 8A) only the elastic members 32A yield elastically. In a second stage (FIG. 8B) the elastic members 32B in turn yield elastically, their effects are added to those of the elastic members 32A, which remain compressed.

Throughout this process the hub counter-flanges 12' remain inoperative, given the corresponding circumferential clearance J1. Only the hub flange 12 is operative at this time.

As previously noted, this process continues until there occurs positive bearing engagement for the circumferential direction concerned between the parts A and B. This is either because the turns of at least one of the elastic members 32A, 32B are again contigous or because at least one of the axial spacers 23 has come into contact with the corresponding circumferential end edge of the notch 24 in the hub flange 12 through which it passes.

In the preceding description, for purposes of simplification, no account has been taken of the phenomenon of hysteresis which occurs on relative angular displacement between the parts A and B by virtue of friction between them. As is known, this hysteresis phenomenon results in a difference, for a given relative angular displacement, between the value of the torque corresponding to an increasing torque and that corresponding to a descreasing torque.

Be this as it may, it emerges from what has been discussed that the circumferential clearance J1 must be greater than the circumferential clearance J2 and that this must itself be greater than the circumferential clearance J3.

It is to be understood that the present invention is not limited to the embodiment described and shown, but encompasses all variants in terms of its execution.

For example and if desired, the hub counter-flanges may be constrained to rotate with one another by axial spacers passing with appropriate clearance through the hub flange with which they are associated.

Also, the number of coaxial parts disposed to rotate relative to one another that the torsional damper device concerned comprises may be greater than two.

Finally, the field of application of the invention is not necessarily limited to that of clutch disks, but may equally well encompass, for example, that of torsional damper devices which, not including any form of friction disk, are used to filter vibrations in continuous variation transmission systems.

We claim:

1. Torsional damper device comprising at least two coaxial parts disposed to rotate relative to one another within defined limits of relative angular displacement and circumferentially acting elastic means operating between said coaxial parts over at least part of said relative angular displacement to resist same, wherein a first of said coaxial parts comprises a hub and an annular hub flange disposed around said hub and constrained to rotate with said hub for one circumferential direction and a second of said coaxial parts comprises at least one annular guide ring disposed around said hub and free to rotate relative thereto in both circumferential directions, said first coaxial part further comprising an annular hub counter-flange disposed around said hub associated with said hub flange and constrained to rotate with said hub for a circumferential direction opposite the one circumferential direction, said hub flange being mounted free to rotate relative to said hub in the opposite circumferential direction and said hub counter-flange being mounted free to rotate relative to said hub in the one circumferential direction.

2. Torsional damper device according to claim 1, wherein said circumferentially acting means comprise elastic members accommodated partially in openings in said hub flange and said hub counter-flange and partially in openings in said at least one guide ring, for at least one of said elastic members said openings in said hub flange and said hub counter-flange have the same circumferential extent as the corresponding opening in said at least one guide ring, and for at least one other of said elastic members said openings in said hub flange and said hub counter-flange are of greater circumferential extent than the corresponding opening in said at least one guide ring, whereby for a rest configuration of the device and for the one circumferential direction at least said at least one other elastic member is engaged with circumferential clearance in said openings in said hub flange and said hub counter-flange.

3. Torsional damper device according to claim 1, further comprising respective meshing means with clearance disposed between said hub and said hub flange and between said hub and said hub counter-flange, and wherein, in an idle configuration of the device, said meshing means with clearance between said hub and said hub flange are in circumferential abutting relationship for the one circumferential direction and said meshing means with clearance between said hub and said hub counter-flange are in circumferential abutting relationship for the opposite circumferential direction.

4. Torsional damper device according to claim 1, further comprising a second annular hub counter-flange disposed on one side of said hub flange and said first annular counter-flange disposed on the other side of said hub flange.

5. Torsional damper device according to claim 4, wherein said first and second hub counter-flanges and said hub flange all have the same configuration.

* * * * *